US012544710B2

(12) United States Patent
Green et al.

(10) Patent No.: US 12,544,710 B2
(45) Date of Patent: Feb. 10, 2026

(54) SYSTEM, METHOD, AND DEVICE FOR CONTINUOUS $CO_2$ CAPTURE USING A $CO_2$ PUMP MEMBRANE (71) Applicant: ARIZONA BOARD OF REGENTS ON BEHALF OF ARIZONA STATE UNIVERSITY, Scottsdale, AZ (US)

(72) Inventors: Matthew Green, Phoenix, AZ (US); Klaus Lackner, Longmont, CO (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 414 days.

(21) Appl. No.: 18/263,691

(22) PCT Filed: Feb. 1, 2022

(86) PCT No.: PCT/US2022/014799
§ 371 (c)(1),
(2) Date: Jul. 31, 2023

(87) PCT Pub. No.: WO2022/165442
PCT Pub. Date: Aug. 4, 2022

(65) Prior Publication Data
US 2024/0115989 A1 Apr. 11, 2024

Related U.S. Application Data (60) Provisional application No. 63/144,421, filed on Feb. 1, 2021.

(51) Int. Cl.
*B01D 53/22* (2006.01)

(52) U.S. Cl.
CPC ...... *B01D 53/228* (2013.01); *B01D 2053/221* (2013.01); *B01D 2257/504* (2013.01);
(Continued)

(58) Field of Classification Search
CPC ............ B01D 53/228; B01D 2053/221; B01D 2257/504; B01D 2311/26; B01D 2313/28; B01D 2315/10; B01D 2325/42
See application file for complete search history.

(56) References Cited

U.S. PATENT DOCUMENTS 3,729,400 A * 4/1973 ward ............... B01D 53/228
205/462
5,281,254 A * 1/1994 Birbara ............ B01D 53/1493
96/5
(Continued)

FOREIGN PATENT DOCUMENTS

WO 2020092273 A1 5/2020

*Primary Examiner* — Anthony Shumate
(74) *Attorney, Agent, or Firm* — FULLER IP LAW LLC; Rodney J. Fuller (57) ABSTRACT

A continuous $CO_2$ capture system, method, and device are disclosed. The device includes a $CO_2$ pump membrane including a moisture-swing material, and a cavity having a first fluid. The $CO_2$ pump membrane separates the first fluid from a second fluid, the fluids creating a water concentration gradient across the membrane and transport of water through the membrane. The water concentration gradient creates a carbon concentration gradient across the membrane that decreases moving from outside the cavity to inside the cavity. As water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity.

20 Claims, 4 Drawing Sheets (52) U.S. Cl.
CPC ...... *B01D 2311/26* (2013.01); *B01D 2313/28* (2013.01); *B01D 2315/10* (2013.01); *B01D 2325/42* (2013.01)

(56) References Cited

U.S. PATENT DOCUMENTS

| | | | | |
|---|---|---|---|---|
| 8,262,774 | B2 | 9/2012 | Liu | |
| 11,383,199 | B1* | 7/2022 | Kolodji | B01D 53/229 |
| 2008/0272052 | A1* | 11/2008 | Wagener | B01D 61/362 |
| | | | | 210/640 |
| 2013/0336722 | A1* | 12/2013 | Wright | B01D 61/445 |
| | | | | 423/437.1 |
| 2014/0102297 | A1 | 4/2014 | Hamad | |
| 2016/0207799 | A1* | 7/2016 | McGinnis | B01D 61/36 |
| 2017/0333834 | A1* | 11/2017 | Worsley | B01D 53/82 |
| 2018/0105780 | A1* | 4/2018 | Rittmann | C12M 41/26 |
| 2019/0143260 | A1* | 5/2019 | Novek | B01D 53/1487 |
| | | | | 95/206 |
| 2020/0188840 | A1* | 6/2020 | Novek | B01D 53/263 |
| 2020/0291313 | A1* | 9/2020 | Narasimhamurthy | C10J 3/57 |
| 2021/0060483 | A1* | 3/2021 | Lackner | B01D 7/02 |
| 2021/0245092 | A1* | 8/2021 | Liu | C01B 32/50 |

\* cited by examiner

SYSTEM, METHOD, AND DEVICE FOR CONTINUOUS $CO_2$ CAPTURE USING A $CO_2$ PUMP MEMBRANE

RELATED APPLICATIONS

This application is the U.S. National Stage of International Patent Application No. PCT/US2022/014799, filed Feb. 1, 2022, which claims the benefit of and priority to U.S. provisional patent application No. 63/144,421, filed Feb. 1, 2021 titled "Continuous $CO_2$ Capture Using a $CO_2$ Pump Membrane," the contents of each of which are hereby incorporated by reference in their entireties.

STATEMENT REGARDING FEDERALLY SPONSORED RESEARCH

This invention was made with government support under DE-AR0001103 awarded by the Department of Energy. The government has certain rights in the invention.

TECHNICAL FIELD

Aspects of this document relate generally to carbon dioxide capture using a membrane.

BACKGROUND

Extracting $CO_2$ from the air has been noted as one of the few technologies able to recover excess carbon from the environment. In addition to ecological concerns, there are also substantial markets for carbon dioxide taken from the atmosphere. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost. As $CO_2$ capture will need to occur on a large scale, simple, efficient, low-cost designs will play an important role in commercial application of atmospheric $CO_2$ capture technologies.

State of the art direct air capture devices can reduce the energy and financial cost, as well as the mechanical complexity and fragility, to a practical level. These devices can passively collect atmospheric carbon dioxide from the ambient air using sorbent materials that capture the carbon dioxide from the atmosphere and subsequently release it for use or sequestration.

However, most direct air capture systems able to operate efficiently collect carbon dioxide in a batch process, gathering in one phase and releasing in another. Not only does this complicate producing a continuous stream of concentrated $CO_2$, but it also requires the use of mechanisms to transition devices between a collection phase and a release phase. These mechanisms eat into an already thin energy budget, and provide numerous potential points of failure (e.g., seals, valves, lifts, doors, etc.).

SUMMARY

According to one aspect, a continuous $CO_2$ capture device includes a $CO_2$ pump membrane having a moisture-swing material that absorbs $CO_2$ when dry and releases $CO_2$ when wet, and a cavity having a first fluid. The cavity is bound and defined by, at least in part, the $CO_2$ pump membrane. The $CO_2$ pump membrane separates the first fluid from a second fluid, the first fluid having a first water concentration, the second fluid having a second water concentration that is less than the first water concentration. The difference between the first water concentration and the second water concentration results in the transport of water through the $CO_2$ pump membrane from the first fluid to the second fluid and the formation of a water concentration gradient across the $CO_2$ pump membrane. The water concentration gradient within the moisture-swing material of the $CO_2$ pump membrane creates a carbon concentration gradient across the $CO_2$ pump membrane that decreases from a second carbon concentration to a first carbon concentration moving from outside the cavity to inside the cavity. As water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity.

Particular embodiments may comprise one or more of the following features. The first fluid may be a gas including water vapor. The first fluid may be an aqueous solution. The moisture-swing material of the $CO_2$ pump membrane may be an anion exchange material. The moisture-swing material of the $CO_2$ pump membrane may be a quaternary ammonium-functionalized polymer. The moisture-swing material of the $CO_2$ pump membrane may be a quaternary ammonium-functionalized poly(arylene ether sulfone) copolymer. The moisture-swing material may have a copolymerization unit based on diallyl bisphenal A (DABA). A majority of the cavity may be bound by the $CO_2$ pump membrane. The second fluid may be an atmosphere.

According to another aspect of the disclosure, a continuous $CO_2$ capture system includes a continuous $CO_2$ capture device. The device has a $CO_2$ pump membrane having a moisture-swing material that absorbs $CO_2$ when dry and releases $CO_2$ when wet, and a cavity having a first fluid. The cavity is bound and defined by, at least in part, the $CO_2$ pump membrane. The $CO_2$ pump membrane separates the first fluid from a second fluid, the first fluid having a first water concentration, the second fluid having a second water concentration that is less than the first water concentration. The difference between the first water concentration and the second water concentration results in the transport of water through the $CO_2$ pump membrane from the first fluid to the second fluid and the formation of a water concentration gradient across the $CO_2$ pump membrane. The system also includes a water input and a product output each in fluidic communication with the cavity of the continuous $CO_2$ capture device. The water concentration gradient within the moisture-swing material of the $CO_2$ pump membrane creates a carbon concentration gradient across the $CO_2$ pump membrane that decreases from a second carbon concentration to a first carbon concentration moving from outside the cavity to inside the cavity. As water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity. The water concentration gradient is maintained by adding replacement fluid having water to the cavity via the water input as the first fluid having captured $CO_2$ is extracted from the cavity through the product output as an extracted fluid, forming a product stream.

Particular embodiments may comprise one or more of the following features. The first fluid may be a gas including water vapor. The system may further include a condenser communicatively coupled to the product output, and a water content may be condensed out of the extracted fluid. The water content condensed out of the extracted fluid may be reintroduced to the cavity through the water input as at least part of the replacement fluid. The first fluid may be an aqueous solution, and the product stream may be a liquid including dissolved inorganic carbon (DIC). The moisture-swing material of the $CO_2$ pump membrane may be an anion exchange material. The moisture-swing material of the $CO_2$ pump membrane may be a quaternary ammonium-functionalized polymer. The moisture-swing material of the $CO_2$ pump membrane may be a quaternary ammonium-functionalized poly(arylene ether sulfone) copolymer. The moisture-swing material may have a copolymerization unit based on diallyl bisphenal A (DABA).

According to yet another aspect of the disclosure, a method for continuous $CO_2$ capture includes forming a water concentration gradient across a $CO_2$ pump membrane by introducing a first fluid having a first water concentration to a cavity. The cavity is bound and defined by, at least in part, the $CO_2$ pump membrane, the $CO_2$ pump membrane separating the first fluid from a second fluid outside the cavity and having a second water concentration that is less than the first water concentration. The difference between the first water concentration and the second water concentration results in the transport of water through the $CO_2$ pump membrane from the first fluid to the second fluid and the formation of the water concentration gradient. The $CO_2$ pump membrane includes a moisture-swing material. The method also includes continuously capturing $CO_2$ from the second fluid by maintaining the water concentration gradient within the $CO_2$ pump membrane. The water concentration gradient within the moisture-swing material of the $CO_2$ pump membrane creates a carbon concentration gradient across the $CO_2$ pump membrane that decreases from a second carbon concentration to a first carbon concentration moving from outside the cavity to inside the cavity, such that as water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity.

Particular embodiments may comprise one or more of the following features. Maintaining the water concentration gradient may include increasing the first water concentration by adding a replacement fluid including water to the cavity and removing first fluid including captured $CO_2$ from the cavity. The first fluid may be a gas including water vapor. The method may further include condensing a water content out of the first fluid removed from the cavity using a condenser. The method may further include reintroducing the water content condensed out of the first fluid removed from the cavity as at least part of the replacement fluid. The first fluid may be an aqueous solution. The moisture-swing material of the $CO_2$ pump membrane may be an anion exchange material. The moisture-swing material of the $CO_2$ pump membrane may be a quaternary ammonium-functionalized polymer. The moisture-swing material of the $CO_2$ pump membrane may be a quaternary ammonium-functionalized poly(arylene ether sulfone) copolymer. The moisture-swing material may have a copolymerization unit based on diallyl bisphenal A (DABA).

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Extracting $CO_2$ from the air has been noted as one of the few technologies able to recover excess carbon from the environment. In addition to ecological concerns, there are also substantial markets for carbon dioxide taken from the atmosphere. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost. As $CO_2$ capture will need to occur on a large scale, simple, efficient, low-cost designs will play an important role in commercial application of atmospheric $CO_2$ capture technologies.

State of the art direct air capture (DAC) devices can reduce the energy and financial cost, as well as the mechanical complexity and fragility, to a practical level. These devices can passively collect atmospheric carbon dioxide from the ambient air using sorbent materials that capture the carbon dioxide from the atmosphere and subsequently release it for use or sequestration.

Most of the current DAC approaches are extracted from methods that are applicable in carbon capture from large point sources. These technologies mostly use chemisorption for the elimination of carbon from a gas stream. Some examples are oxides, hydroxides or alkaline salts which have high chemical binding energy with $CO_2$, and as a result, high capacities and selectivities for carbon capture. However, the regeneration of these sorbents requires high temperatures to overcome these high binding energies and they are corrosive liquid solutions. The high energy demand of these sorbents makes them uneconomical for use in capturing ambient, dilute carbon dioxide.

Another option are sorbents that capture $CO_2$ by physisorption. Materials which capture $CO_2$ via physisorption have lower regeneration energy requirements due to weaker bonds, but the drive for carbon capture is also lower. This makes the use of such materials impractical for DAC, which deals with low partial pressures of $CO_2$.

Still another method makes use of humidity or moisture-swing sorbent materials. At low humidity levels, carbonate ions present on a moisture swing material react with the few remaining waters to form bicarbonate and hydroxide ions. This reaction is favored at low water content because the lack of water preferentially destabilizes the hydration cloud of the doubly charged carbonate ion. The presence of hydroxide attracts $CO_2$ and makes the dry material a strong sorbent for $CO_2$. Exposure to moisture re-stabilizes carbonate relative to bicarbonate. In the loaded bi-carbonate state, this transition destabilizes the bicarbonate and results in a much higher equilibrium partial pressure of $CO_2$. By harvesting the $CO_2$ gas, one can induce the material to fall back to the carbonate state. Subsequent drying will once again produce a bicarbonate/hydroxide mixture that will repeat the collection cycle.

The moisture swing method is advantageous compared to the two previous methods because it has high selectivity and capacity for carbon capture and low regeneration costs. Because the sorbent's affinity to $CO_2$ changes through the interaction with moisture, the carbon can be released without the need of high thermal energy input.

Conventional DAC systems making use of moisture-swing sorbent materials collect carbon dioxide in a batch process, gathering in one phase (e.g., dry) and releasing in another (e.g., wet). These batch processes that have traditionally been challenging to commercialize, for several reasons. The intermittent nature of the batch process makes it difficult to efficiently produce a continuous stream of concentrated $CO_2$ that is ideal for many subsequent applications. Additionally, these batch processes require mechanisms to transition the system between the two phases. The required seals, valves, motors, pumps, doors, lifts, and the like, each introduce a new potential point of failure. These mechanisms can also increase the initial capital cost and/or operating cost for the system.

Contemplated herein is a system, device, and method for continuous $CO_2$ capture using a $CO_2$ pump membrane. In the context of the present description and the claims that follow, a $CO_2$ pump membrane is a $CO_2$ permeable membrane that actively pumps carbon dioxide while transferring water from a wet side to a dry side. This membrane can effectively function as a pump with no moving parts, which provides a number of advantages over conventional direct air capture technology.

When one side of the pump membrane is exposed to high levels of moisture and the other side is exposed to a substantially lower level of moisture, and the difference in moisture level is maintained, then water will be transported across the membrane, following a water concentration gradient. At the same time, $CO_2$ molecules will enter the membrane at the dry side and will be expelled on the wet side, maintaining a chemical potential gradient that can overcome a substantial concentration difference or chemical potential pressure between the two sides of the membrane. The membrane can continuously pump $CO_2$ by evaporating water. This pumping action can drive $CO_2$ into a moist gas or a liquid that can hold $CO_2$. This $CO_2$-enriched moist gas or liquid can be continuously exchanged with gas or liquid from which $CO_2$ has been removed. This may be implemented as a continuous source of $CO_2$, which is advantageous in many downstream applications more adapted for constant gas supply rather than intermittent delivery from a batch capture process.

This technology improves upon current direct air capture (DAC) technology by eliminating a great deal of equipment, moving parts, energy expenditure, and cost. Additionally, systems and devices using $CO_2$ pump membranes contemplated herein do not require the use of strong sorbent liquids, and are thus relatively benign, posing little risk of releasing hazardous materials. The safe nature of these devices makes them well suited for unsupervised operation, even in an urban environment.

While both technologies make use of materials having similar properties, the systems, devices, and methods contemplated herein are advantageous over other capture methods making conventional, batched use of swing materials, such as heat and/or moisture swing materials. Swing-based methods fundamentally have two phases or states of operation, capture and release. Transitioning between states typically requires energy expenditure and often require the incorporation of moving parts, ranging from actuated valves to lifting motors and/or hydraulics. Phased swing-based devices provide product gas (e.g., $CO_2$-enriched gas, etc.) in bursts. A continuous product stream is possible through the coordinated operation of multiple swing units, timed such that at least one unit is always releasing the captured carbon dioxide.

Advantageously, the systems, devices, and methods contemplated herein employ a continuous pumping action, providing a continuous stream of $CO_2$-rich product fluid. For some applications, such as applications with continuous processing or output, a continuous stream of carbon dioxide may be preferred over gas provided in batches due to cost and/or efficiency. Additionally, the continuous capture systems, devices, and methods contemplated herein typically make use of structures and mechanisms that are much simpler than those used in swing-based technology that must toggle between capture and release phases. This may decrease the cost of manufacture, operation, and upkeep, and may allow the systems to operate unattended for longer periods of time.

It should be noted that while the following discussion is made in the context of systems, methods, and devices that passively (e.g., relying on natural air currents, etc.) capture gaseous carbon dioxide from the atmosphere, the various embodiments contemplated herein may be readily adapted for use in capturing $CO_2$ from non-atmospheric sources (e.g., upgrading gas captured using these or other methods, etc.), and may also be readily adapted for use in non-passive systems (e.g., using forced air, etc.). Additionally, in the context of the present description and the claims that follow, the terms 'atmosphere' or 'atmospheric' refers to the environment immediately outside of the device, and should not be interpreted to be limited to outdoor environments, or to exclude environments that are not in fluid communication with the ambient air.

Figure 1A:
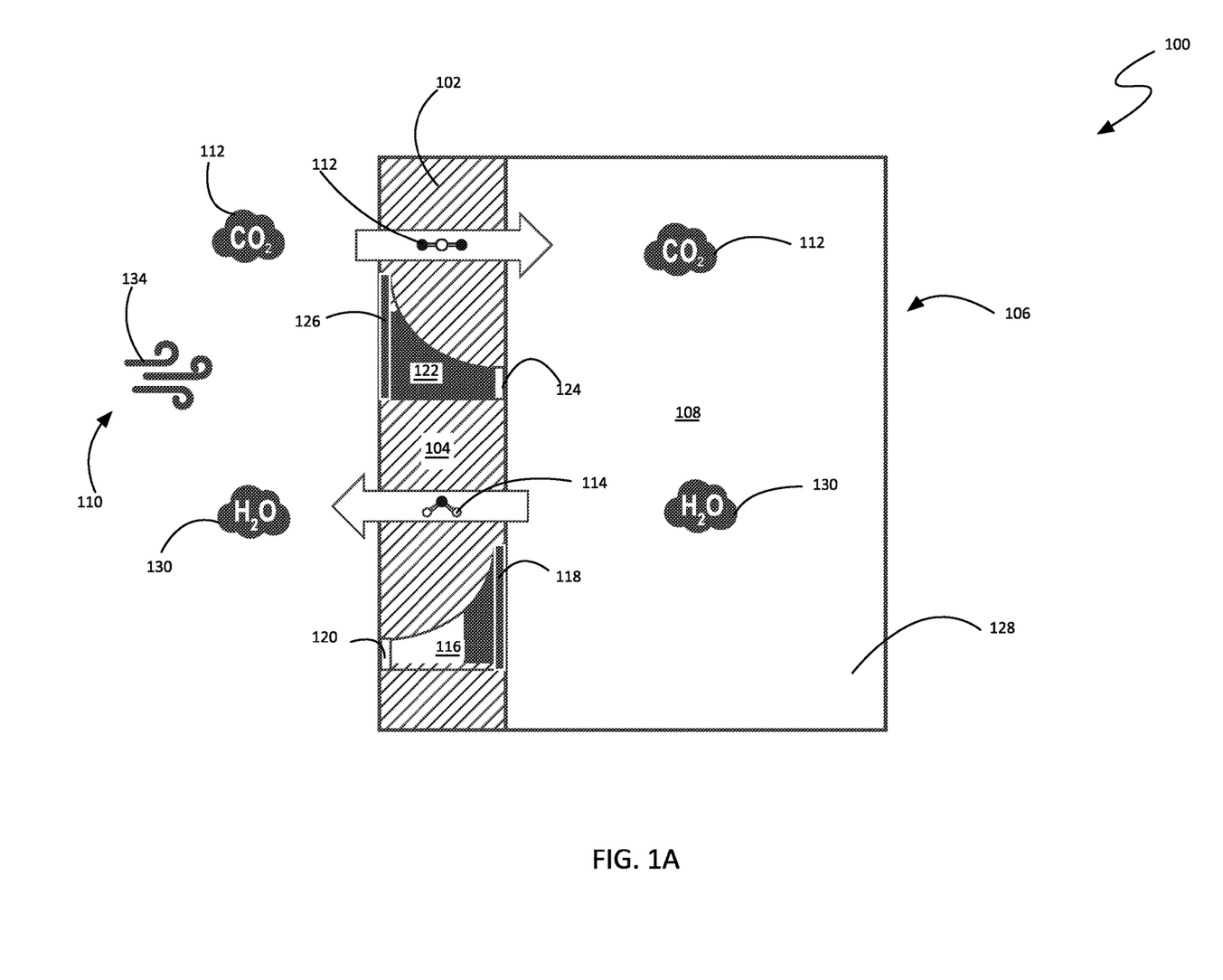
FIG. 1A is a schematic view of a device for continuous $CO_2$ capture using a $CO_2$ pump membrane and water vapor.
Figure 1B:
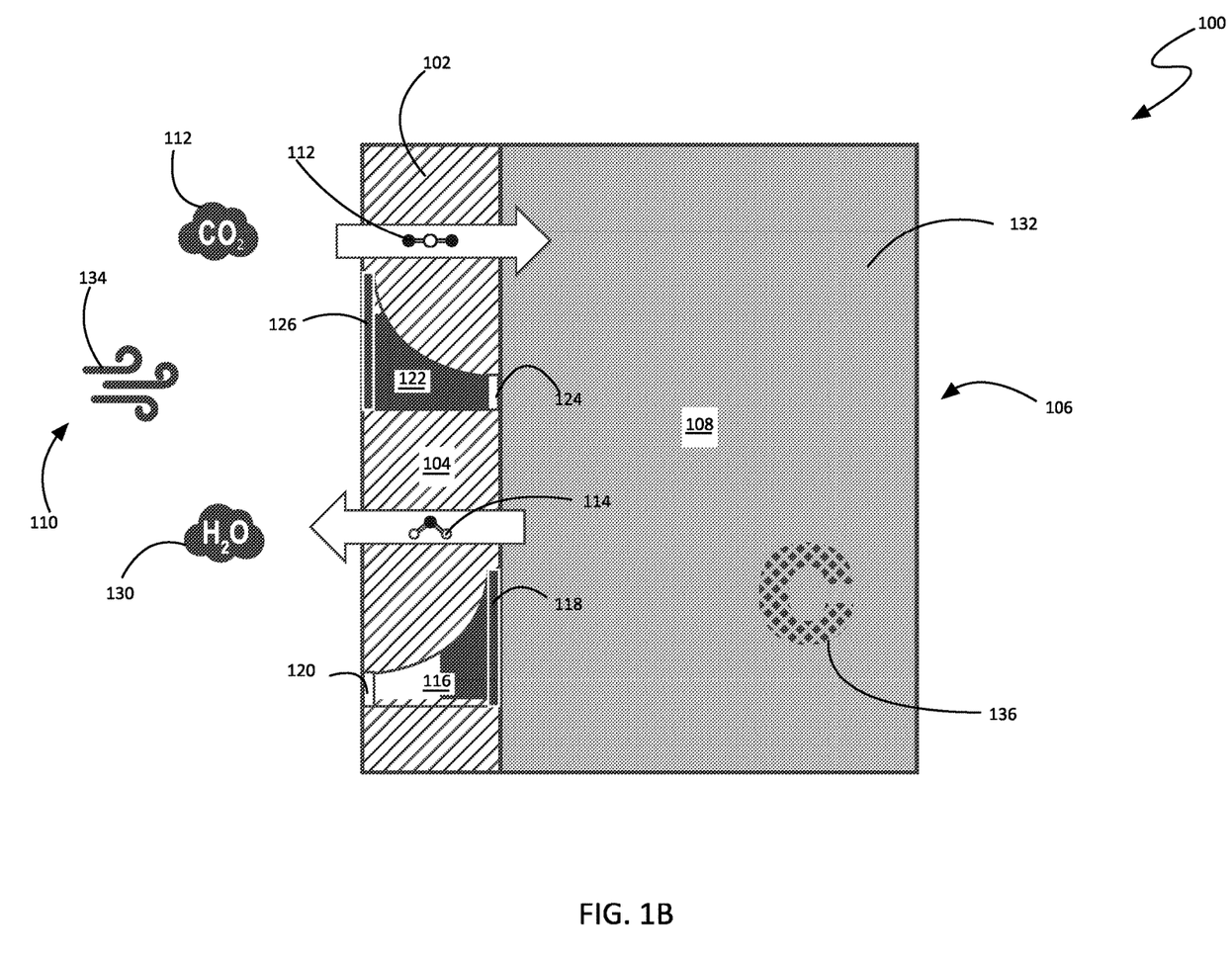
FIG. 1B is a schematic view of a device for continuous $CO_2$ capture using a $CO_2$ pump membrane and an aqueous solution.

FIGS. 1A and 1B show non-limiting examples of devices for continuous $CO_2$ capture using a $CO_2$ pump membrane. Specifically, FIG. 1A is a schematic view of a non-limiting example of a device using a $CO_2$ pump membrane with water vapor, and FIG. 1B is a schematic view of a non-limiting example of a device using a $CO_2$ pump membrane with an aqueous solution.

As shown, each continuous $CO_2$ capture device 100 (hereinafter "capture device 100" or "device 100") comprises a $CO_2$ pump membrane 102 and a cavity 106. The cavity 106 is bound and defined by, at least in part, the $CO_2$ pump membrane 102. The $CO_2$ pump membrane 102 separates a first fluid 108 contained within the cavity 106 from a second fluid 110 that is outside the cavity 106. Each will be discussed in turn, below.

The $CO_2$ pump membrane 102 comprises a moisture-swing material 104 that absorbs $CO_2$ when dry and releases $CO_2$ when wet. As previously discussed, when one side of the $CO_2$ pump membrane 102 is exposed to high levels of moisture and the other side is exposed to a substantially lower level of moisture, and the difference in moisture level is maintained, then water 114 will be transported across the membrane 102, following a water concentration gradient 116. At the same time, carbon dioxide 112 will enter the membrane 102 through the dry side (i.e., outside the cavity 106) and will be expelled on the wet side (i.e., inside the cavity 106), maintaining a chemical potential gradient that can overcome a substantial concentration difference (e.g., two orders of magnitude, etc.) or chemical potential pressure between the two sides of the membrane 102.

According to various embodiments, the $CO_2$ pump membrane 102 comprises a strong base anionic material, or anion exchange material. These materials are sometimes used in conventional moisture-swing based carbon dioxide capture systems previously discussed, where they are employed in a phased or batch process that is very different from the way they are used in the contemplated systems and devices. In other embodiments, the $CO_2$ pump membrane 102 may be composed of other materials that have the property of absorbing carbon dioxide 112 when they are dry and releasing it when exposed to moisture 114.

Some moisture-swing materials 104 may be better adapted for use in some embodiments of the $CO_2$ pump membrane 102 than others. For example, some moisture-swing materials 104, such as some resins, tend to be brittle and can be difficult to process into fibers or membranes for using in a continuous process. Some moisture-swing materials 104, however, are well adapted for such uses, having robust mechanical properties.

As a specific example, in some embodiments, the pump membrane 102 may be composed of a quaternary ammonium-functionalized polymer. For example, in one embodiment, the pump membrane 102 may be composed of a quaternary ammonium-functionalized poly(arylene ether sulfone) copolymer, such as a polysulfone having a copolymerization unit based on diallyl bisphenal A (DABA).

Materials 104 such as this are advantageous, as they are better adapted to processing than other materials 104 with similar properties. One advantage is that they may be formed into hollow membrane fibers, as will be discussed below in greater detail.

Depending on the moisture-swing material 104 being used, the $CO_2$ pump membrane 102 may take on various forms. Continuing with the non-limiting example of a polysulfone having a copolymerization unit based on DABA, the polymer is processable into a range of forms including, but not limited to, porous films, dense films, nonwoven fibrous membranes, and hollow fibers. The pore sizes in the porous materials can range from about 2 µm to about 50 µm. Film thicknesses can range from 50 nm to 5 mm and greater. According to various embodiments, the hollow fibers can be on the order of 0.5-5 mm in diameter, with wall thicknesses of 50-500 µm. The fibrous membranes can be prepared by electrospinning with fiber diameters ranging from 100 nm-10 µm or by melt blowing with fiber diameters ranging from 500 nm to 100 µm. Those skilled in the art will recognize that other processing and preparation methods and techniques may be utilized to create $CO_2$ pump membranes 102 having a wide range of structures, forms, and mechanical properties.

The cavity 106 contains the first fluid 108, which is responsible for delivering moisture to one side of the $CO_2$ pump membrane 102. In some embodiments, the first fluid 108 is liquid water 114 or an aqueous solution 132 that may contain alkalinity. The chemical potential of carbon dioxide 112 in the solution 132 is reflected in the equilibrium partial pressure over the solution 132. The alkalinity of the solution 132 then determines the capacity of the solution 132 to hold carbon dioxide 112. According to various embodiments, the chemical potential of the solution 132 will match the chemical potential of the $CO_2$ 112 at the surface of the membrane 102, which can be characterized by the $CO_2$ partial pressure in equilibrium with the membrane at 100% relative humidity. Over time, the aqueous solution 132 will build up an increasing concentration of dissolved inorganic carbon (DIC) 136.

In other embodiments, the first fluid 108 may be a gas 128 comprising water vapor 130. In operation, the water vapor 130 in the cavity 106 is substantially saturated at a given operating temperature, according to various embodiments. In the context of the present description and the claims that follow, substantially saturated means a water saturation inside the cavity 106 (e.g., the wet side of the membrane 102) that is substantially higher than in the ambient atmosphere 134 outside of the cavity 106, and at least 90% humidity. In some embodiments, the relative humidity within the cavity 106 may be even higher, in excess of 90% in some embodiments, and in excess of 99% in others. In other embodiments, however, the relative humidity within the cavity 106 may be closer to the midpoint between full saturation and the ambient relative humidity, or possibly even lower, so long as the cavity 106 is more saturated than the ambient air. Such a configuration may be desirable in conditions where the ambient humidity is very low and where there are constraints on the water supply used to replenish the cavity's moisture. The maintenance of this water vapor 130 will influence the rate at which carbon dioxide 112 is pulled out of the atmosphere 134, through the membrane 102, and into the cavity 106. In some embodiments, the water vapor 130 may be supplied by an inner, porous and hydrophobic conduit filled with liquid water.

The second fluid 110 is the fluid external to the cavity 106. As previously mentioned, while the non-limiting examples discussed herein are focused on scenarios where the second fluid 110 is the atmosphere 134, those skilled in the art will recognize that the contemplated systems, methods, and devices may also be used to collect $CO_2$ from other sources. Exemplary second fluids 110 include, but are not limited to, $CO_2$-rich fluid collected through other methods or at another timer or place (e.g., for the purpose of upgrading the fluid), industrial byproduct or exhaust, scrubbing $CO_2$ from a closed environment, and the like.

According to various embodiments, the cavity 106 is defined and bound by, at least in part, the $CO_2$ pump membrane 102. In some embodiments, a majority of the cavity 106 is bound by the pump membrane 102. In the context of the present description and the claims that follow, a cavity 106 is defined by and bound by a membrane when the membrane makes up the wall that separates the inside of the cavity from the outside of the cavity, for at least part of the cavity 106.

Figure 2A:
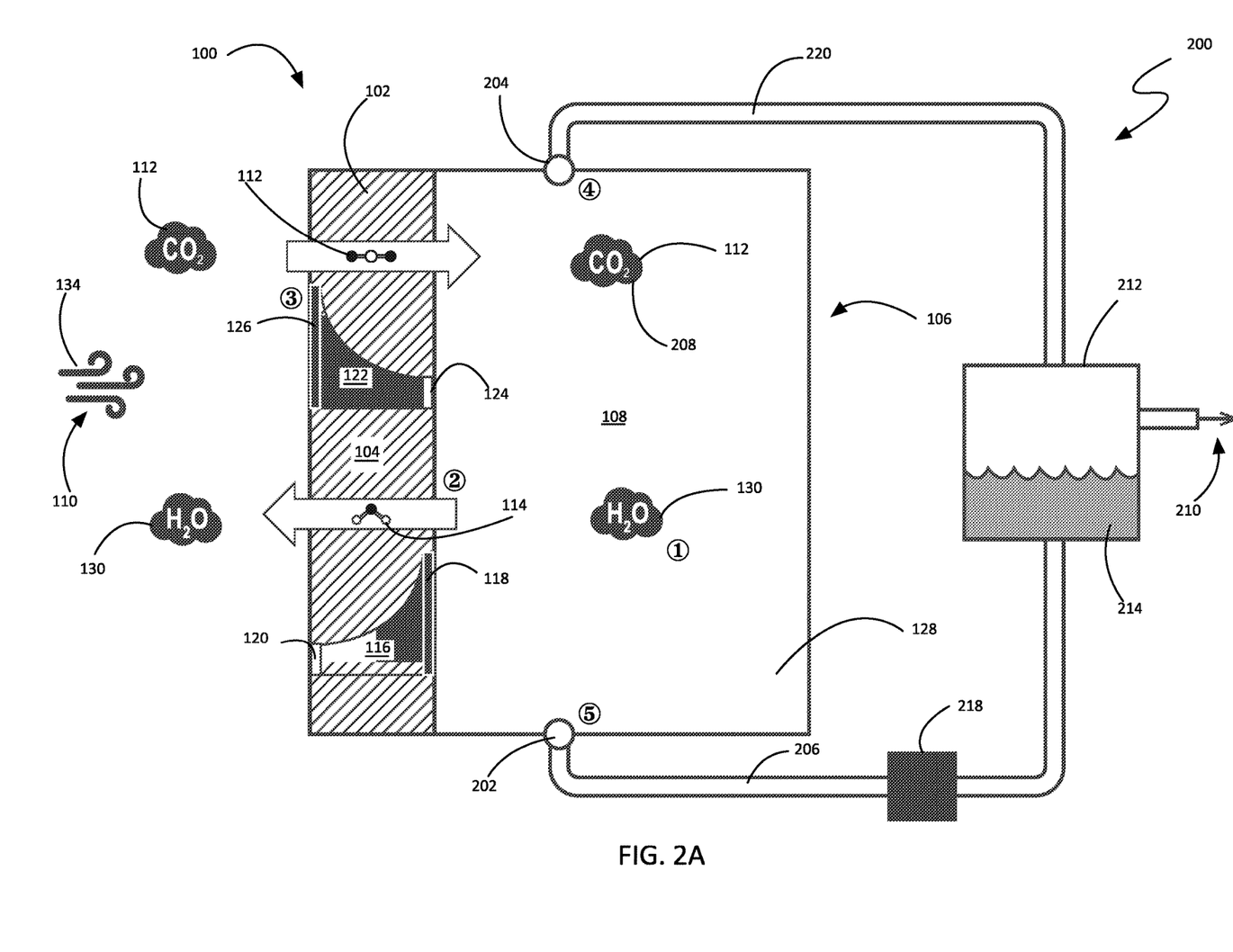
FIG. 2A is a schematic view of a system for continuous $CO_2$ capture using a $CO_2$ pump membrane and water vapor.
Figure 2B:
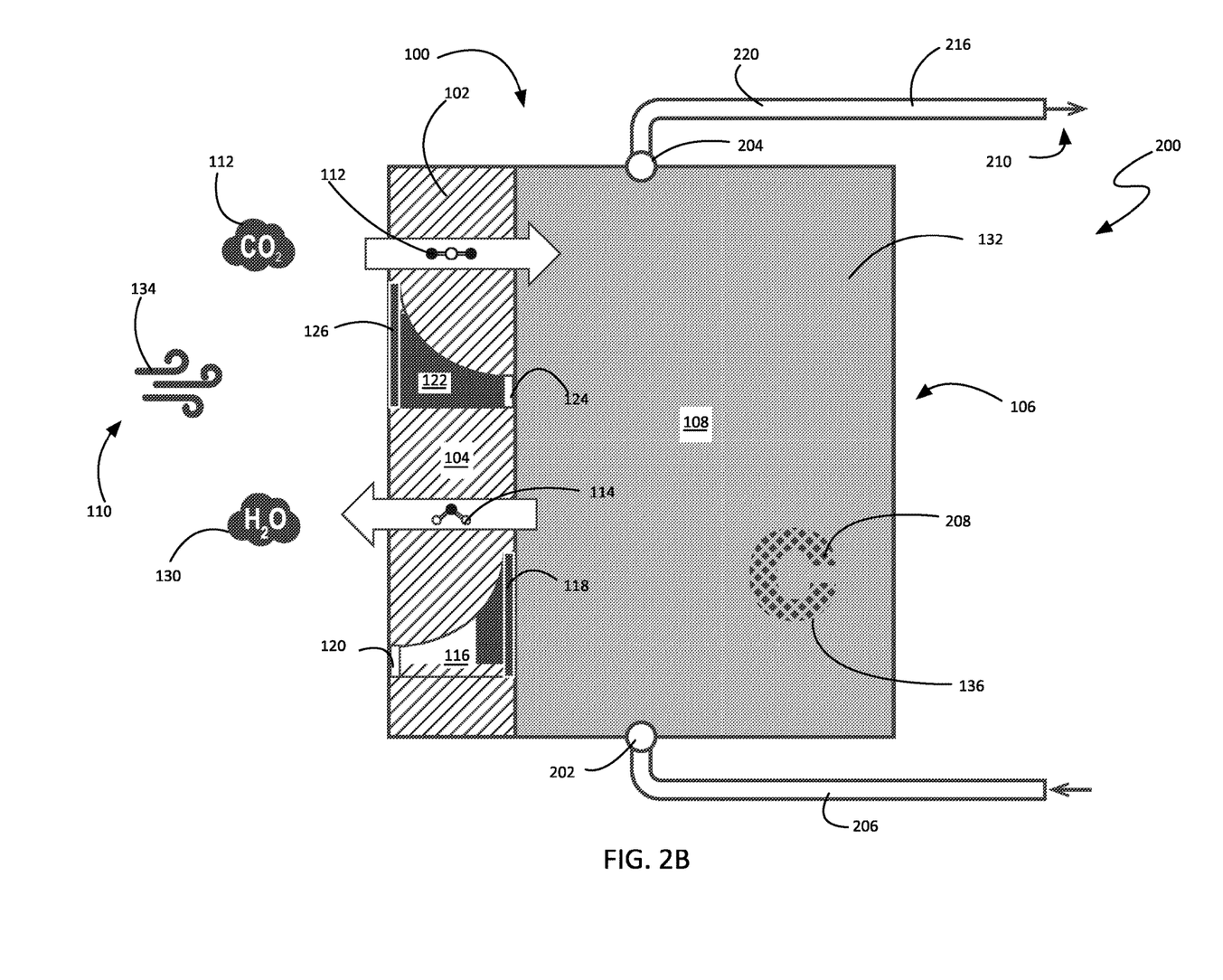
FIG. 2B is a schematic view of a system for continuous $CO_2$ capture using a $CO_2$ pump membrane and an aqueous solution.

It should be noted that the cavity 106 shown in FIGS. 1A and 1B is depicted as being completely closed. While some embodiments may have a sealed cavity 106, the continuous pumping of $CO_2$ through the membrane would eventually stop, and the recovery of the captured $CO_2$ would require breaching the cavity 106. Most other embodiments of the cavity 106, including the non-limiting examples utilized in the systems of FIGS. 2A and 2B, are in fluidic communication with a water source and/or $CO_2$-rich fluid outlet through one or more openings, which will be discussed in greater detail with respect to FIGS. 2A and 2B. The lack of openings in FIGS. 1A and 1B should not be construed as a limitation; other embodiments of the contemplated device 100 may have one or more openings.

In some embodiments, the cavity 106 may be a conduit. In the context of the present description and the claims that follow, a conduit refers to a channel or tube that is able to convey a fluid, whether it be a liquid or a gas. Although the word 'tube' may be used to describe a conduit, the conduits contemplated herein are not limited to hollow cylinders, but rather could be any hollow body having at least one end point, or aperture through which a fluid may be conveyed. Some conduits may have two such apertures, allowing for a fluid to flow from one aperture, through the hollow void, and out the other aperture.

In some embodiments, $CO_2$ capture can be accomplished by shaping the pump membrane into conduits, or hollow fibers, through which a carbonate solution flows. As a specific example, in one embodiment, the membrane pumping action is moving $CO_2$ from the outside and acidifying the carbonate solution to bicarbonate until the chemical potential reaches the limit the pumping action can deliver. The collected $CO_2$ from the atmosphere 134 is transferred into a carbonate solution, circulating inside closed-loop fibers. The proposed process has passively delivered $CO_2$ on its dry side and active pumping across a membrane over to its wet side without external energy input. The downhill transport of water enables the uphill push of $CO_2$, creating an actively pumping membrane. The dilution of water into dry air releases free energy that is at least partially applied to concentrate $CO_2$. Since the compression factor of the $CO_2$ exceeds the expansion factor of the water, more water must pass through the membrane than $CO_2$ is pumped inward against a chemical potential.

A transfer of carbon dioxide gas 112 from an external or ambient air current, through the $CO_2$ pump membrane 102, to the interior of the conduit-shaped cavity 106, will depend in part upon the fluid dynamic characteristics of the outer surface of the conduits, such as the thickness of the boundary layer on the outside, according to various embodiments. Some embodiments may comprise conduits that are composed entirely of a single $CO_2$ pump membrane 102, which may be easier to make smooth and thereby reduce the boundary layer thickness. In other embodiments, a conduit may be composed of one or more $CO_2$ pump membranes 102 coupled to, or integral with, other materials that may provide structural and/or manufacturing advantages that may outweigh any boundary layer thickening caused by discontinuities in the surface. In some embodiments, a $CO_2$ pump membrane 102 may be coupled to another material inside the device, such as a porous backing to provide mechanical strength.

In embodiments employing a continuous flow behind the pump material to harvest the $CO_2$-rich gas, and capturing through conduits, the dimensions of the conduits may be designed for an improved uptake rate of $CO_2$ on the surface of the $CO_2$ pump membrane 102. Flow rates within the device 100 may be designed to match the uptake rates from the air. The uptake rate on the conduit will depend on the material choice for the $CO_2$ pump membrane 102. These mass transfer coefficients will need to be matched with the mass transfer coefficient across the boundary layer along the outer surface of the conduit (e.g., the boundary layer created as air flows past the conduit). Matching these coefficients constrains the dimensions of the conduits (e.g., the diameter of a tubular conduit, etc.), according to various embodiments.

For small conduits and low flow speeds, the boundary layer thickness is directly related to the dimensions of the conduit. The boundary layer thickness results in a transfer coefficient for $CO_2$ from the open air to the surface of the conduit, which is given by the diffusion constant divided by the thickness of the boundary layer. This coefficient can be matched to the membranes transfer coefficient. By selecting $CO_2$ pump membrane 102 materials and conduit geometries such that these coefficients are substantially similar to each other, none of the various transfers dominates the process.

In other embodiments, the cavity 106 may be shape of other volumes that do not resemble conduits. The practicality and utility of different geometries for the cavity 106 depends on a number of considerations including, but not limited to, the mechanical properties of the $CO_2$ pump membrane 102, the moisture-swing material 104 used in the pump membrane 102, the nature of the first fluid 108, the rate of movement within the device, and the like.

As previously mentioned, the continuous pumping process is driven by the difference in water concentration on either side of the $CO_2$ pump membrane 102. As shown, if the first fluid 108 has a first water concentration 118 and the second fluid 110 has a second water concentration 120 that is less than the first water concentration 118, the difference between the first water concentration 118 and the second water concentration 120 results in the transport of water 114 through the $CO_2$ pump membrane 102 from the first fluid 108 (i.e., inside the cavity 106) to the second fluid 110 (i.e., the atmosphere 134 outside the cavity 106) and the formation of a water concentration gradient 116 across the $CO_2$ pump membrane.

The $CO_2$ pump membrane 102 comprises a moisture-swing material 104. The creation and maintenance of this water concentration gradient 116 causes the formation of a carbon concentration gradient 122 across the $CO_2$ pump membrane 102 in the opposite direction. This carbon concentration gradient 122 decreases from a second carbon concentration 126 (i.e., on the membrane surface in fluidic contact with the atmosphere 134) to a first carbon concentration 124 (i.e., on the membrane surface in fluidic contact with the first fluid 108), moving from outside the cavity 106 to inside the cavity 106. This carbon concentration gradient 122 maintains its sign (e.g., direction), even though the carbon dioxide concentration on the inside may increase 500-fold, or more, according to various embodiments.

As water 114 is continuously transported from the first fluid 108 to the second fluid 110 through the $CO_2$ pump membrane 102 because of the water concentration gradient, carbon dioxide 112 is continuously captured from the second fluid 110 by the moisture-swing material 104 of the $CO_2$ pump membrane 102 and continuously pumped along the carbon concentration gradient 122 across the $CO_2$ pump membrane 102 and into the first fluid 108 within the cavity 106.

The carbon concentration gradient 122 can be maintained, even if the chemical potential of carbon dioxide 112 on the wet inside surface of the membrane 102 is significantly higher than on the dry atmospheric surface, so long as a water concentration gradient 116 is maintained by the water 114 flowing from the inside to the atmosphere 134 through the walls of the membrane 102. The exergy required for this $CO_2$ pumping action is derived from the dilution of water 114 into the dry atmosphere 134 as it flows spontaneously from a higher chemical potential to a lower chemical potential. According to various embodiments, the material of the $CO_2$ pump membrane 102 may have diffusion constants for the relevant ions (e.g., carbonate, bicarbonate, hydroxide, etc.) and water that are on the order of 10-9 to 10-12 m2/sec.

FIGS. 2A and 2B are schematic views of non-limiting examples of systems for continuous $CO_2$ capture using a $CO_2$ pump membrane. Specifically, FIG. 2A is a schematic view of a non-limiting example of a system using a $CO_2$ pump membrane with water vapor, and FIG. 2B is a schematic view of a non-limiting example of a system using a $CO_2$ pump membrane with an aqueous solution.

According to various embodiments, a continuous $CO_2$ capture system 200 (hereinafter "system 200") comprises a continuous $CO_2$ capture device 100 whose cavity 106 is in fluidic communication with a water input 202 through which a replacement fluid 206 comprising water 114 can be provided, and a product output 204 through which first fluid 108 containing captured carbon dioxide 208 may be extracted. In some embodiments, the system 200 may comprise a single device 100, while in other embodiments the system 200 may comprise multiple continuous $CO_2$ capture devices 100 advantageously sharing resources (e.g., replacement fluid 206, water vapor 130, electricity, etc.) and/or infrastructure (e.g., product stream refinement mechanisms, conduits, compressors, condensers, vaporizers, etc.).

A generalized process for capturing atmospheric carbon dioxide 112 using a continuous $CO_2$ capture system 200 having a $CO_2$ pump membrane 102 is shown in FIG. 2A. The continuous capture process beings with the introduction of water 114 on the inside of the device 100 (i.e., inside the cavity 106). See 'circle 1'. In some embodiments, this water 114 may be in the form of water vapor 130, while in other embodiments, it may be liquid water or an aqueous solution 132. In some embodiments, other materials may be in this moisture-providing fluid, be it gaseous or liquid.

The introduction of water 114 to the cavity 106 results in that fluid (i.e., the first fluid 108) having a first water concentration 118 that is higher than the water concentration of the atmosphere 134 on the other side of the membrane 102 (i.e., the second water concentration 120 of the second fluid 110). The difference between these two concentrations causes water 114 to move from the cavity 106, through the $CO_2$ pump membrane 102, out into the atmosphere 134, creating a water concentration gradient 116. See 'circle 2'.

The creation of the water concentration gradient 116 causes the formation of a carbon concentration gradient 122 across the $CO_2$ pump membrane 102. See 'circle 3'. The carbon concentration gradient 122 has a second carbon concentration 126 at the outside surface of the membrane 102 (i.e., the dry surface) that is higher than a first carbon concentration 124 at the inside surface of the membrane 102 (i.e., the wet surface). This carbon concentration gradient 122 actively pumps carbon dioxide 112 out of the atmosphere 134 and into the first fluid 108 of the device 100 as captured carbon dioxide 208. In some embodiments, this captured carbon dioxide 208 is gaseous, while in other embodiments it may be dissolved in a liquid that may also be providing moisture to drive the pump membrane 102 (i.e., dissolved inorganic carbon 136 in an aqueous solution 132).

Next, while the carbon dioxide 112 is being pumped across the membrane 102, the first fluid 108 comprising captured carbon dioxide 208 and water 114 is extracted from the cavity 106 through the product output 204 as an extracted fluid 220, forming a product stream 210. See 'circle 4'. In some embodiments, this harvesting may be performed with a mechanical pump (not shown), while in other embodiments, the harvest may be performed using a different method or mechanism that is able to maintain a pressure differential between the wet side and the atmosphere 134, and provides a product stream 210 comprising the captured carbon dioxide 208.

In some embodiments, the extracted fluid 220 and product stream 210 may be gaseous, and may be removed from the cavity 106 using a variety of methods. In some embodiments, the interior of the device 100 may be evacuated to harvest the gas, while in other embodiments, the captured carbon dioxide 208 may be removed by displacing it with a sweep gas. Exemplary sweep gases include, but are not limited to, water vapor, atmospheric air, inert gas, and the like. In other embodiments, the extracted fluid 220 and product stream 210 may be liquid (e.g., the product stream 210 may be a liquid 216 comprising dissolved inorganic carbon 136, etc.).

According to various embodiments, a system 200 employing a $CO_2$ pump membrane 102 is able to output a continuous product stream 210. In the context of the present description and the claims that follow, a product stream 210 from a device 100 is a stream of fluid having a higher carbon dioxide concentration than the second fluid 110 (e.g., the atmosphere 134, etc.). The product stream 210 may be stored for subsequent processing or use, or it may be inserted directly into an application local to the system 200.

As previously mentioned, the membrane 102 will continue to pump $CO_2$ continuously, so long as the water concentration gradient 116 is maintained. According to various embodiments, the water concentration gradient 116 is maintained by adding replacement fluid 206 comprising water 114 to the cavity 106 via the water input 202 as the first fluid 108 comprising captured $CO_2$ 208 is extracted from the cavity 106 through the product output 204. See 'circle 5'. Additionally, in some embodiments, since the compression factor of the $CO_2$ 112 exceeds the expansion factor of the water 114, more water 114 must pass through the membrane than $CO_2$ 112 is pumped inward against a chemical potential.

In some embodiments, the replacement fluid 206 may be provided entirely from an external source. See, for example, the system 200 shown in FIG. 2B. In other embodiments, however, part of the replacement fluid 206 may be recovered from the extracted fluid 220. See, for example, the system 200 shown in FIG. 2A, where the extracted fluid 220 primarily comprises gaseous captured $CO_2$ 208 and water vapor 130. The water content 214 of the extracted fluid 220 may be substantially removed from the extracted fluid 220 by turning it into liquid water 114 using a condenser 212 or pump. This results in a $CO_2$ continuous product stream 210 with much higher $CO_2$ concentration. According to various embodiments, the condensed liquid water 114 then passes through a vaporizer 218 or other device capable of turning liquid water into a gas, where it is turned into water vapor 130 and becomes part of the replacement fluid 206.

It will be understood that embodiments are not limited to the specific components disclosed herein, as virtually any components consistent with the intended operation of a system, method, and/or device implementation for continuous $CO_2$ capture using a $CO_2$ pump membrane may be utilized. Accordingly, for example, although particular membranes, materials, components, and mechanisms may be disclosed, such components may comprise any shape, size, style, type, model, version, class, grade, measurement, concentration, material, weight, quantity, and/or the like consistent with the intended operation of a system, method, and/or device for continuous $CO_2$ capture using a $CO_2$ pump membrane may be used. In places where the description above refers to particular embodiments of a system, method, and/or device for continuous $CO_2$ capture using a $CO_2$ pump membrane, it should be readily apparent that a number of modifications may be made without departing from the spirit thereof and that these embodiments and implementations may be applied to other capture technologies as well. Accordingly, the disclosed subject matter is intended to embrace all such alterations, modifications and variations that fall within the spirit and scope of the disclosure and the knowledge of one of ordinary skill in the art.

What is claimed is:
1. A continuous $CO_2$ capture device, comprising:
a $CO_2$ pump membrane comprising a moisture-swing material that absorbs $CO_2$ when dry and releases $CO_2$ when wet;
a cavity comprising a first fluid, the cavity bound and defined by, at least in part, the $CO_2$ pump membrane, the $CO_2$ pump membrane separating the first fluid from a second fluid, the first fluid having a first water concentration, the second fluid having a second water concentration that is less than the first water concentration, the difference between the first water concentration and the second water concentration resulting in the transport of water through the $CO_2$ pump membrane from the first fluid to the second fluid and the formation of a water concentration gradient across the $CO_2$ pump membrane;
wherein the water concentration gradient within the moisture-swing material of the $CO_2$ pump membrane creates a carbon concentration gradient across the $CO_2$ pump membrane that decreases from a second carbon concentration to a first carbon concentration moving from outside the cavity to inside the cavity; and
wherein as water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity.

2. The device of claim 1, wherein the first fluid is an aqueous solution.

3. The device of claim 1, wherein the moisture-swing material of the $CO_2$ pump membrane is an anion exchange material.

4. The device of claim 1, wherein the moisture-swing material of the $CO_2$ pump membrane is a quaternary ammonium-functionalized polymer.

5. The device of claim 1, wherein the moisture-swing material of the $CO_2$ pump membrane is a quaternary ammonium-functionalized poly(arylene ether sulfone) copolymer.

6. The device of claim 5, wherein the moisture-swing material has a copolymerization unit based on diallyl bisphenal A (DABA).

7. The device of claim 1, wherein a majority of the cavity is bound by the $CO_2$ pump membrane.

8. The device of claim 1, wherein the second fluid is an atmosphere.

9. A continuous $CO_2$ capture system, comprising:
  a continuous $CO_2$ capture device, the device having a $CO_2$ pump membrane comprising a moisture-swing material that absorbs $CO_2$ when dry and releases $CO_2$ when wet, and a cavity comprising a first fluid, the cavity bound and defined by, at least in part, the $CO_2$ pump membrane, the $CO_2$ pump membrane separating the first fluid from a second fluid, the first fluid having a first water concentration, the second fluid having a second water concentration that is less than the first water concentration, the difference between the first water concentration and the second water concentration resulting in the transport of water through the $CO_2$ pump membrane from the first fluid to the second fluid and the formation of a water concentration gradient across the $CO_2$ pump membrane; and
  a water input and a product output each in fluidic communication with the cavity of the continuous $CO_2$ capture device;
  wherein the water concentration gradient within the moisture-swing material of the $CO_2$ pump membrane creates a carbon concentration gradient across the $CO_2$ pump membrane that decreases from a second carbon concentration to a first carbon concentration moving from outside the cavity to inside the cavity;
  wherein as water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity;
  wherein the water concentration gradient is maintained by adding replacement fluid comprising water to the cavity via the water input as the first fluid comprising captured $CO_2$ is extracted from the cavity through the product output as an extracted fluid, forming a product stream.

10. The system of claim 9, wherein the first fluid is a gas comprising water vapor.

11. The system of claim 10, further comprising a condenser communicatively coupled to the product output, wherein a water content is condensed out of the extracted fluid.

12. The system of claim 11, wherein the water content condensed out of the extracted fluid is reintroduced to the cavity through the water input as at least part of the replacement fluid.

13. The system of claim 9, wherein the first fluid is an aqueous solution, and the product stream is a liquid comprising dissolved inorganic carbon (DIC).

14. A method for continuous $CO_2$ capture, comprising:
  forming a water concentration gradient across a $CO_2$ pump membrane by introducing a first fluid having a first water concentration to a cavity, the cavity bound and defined by, at least in part, the $CO_2$ pump membrane, the $CO_2$ pump membrane separating the first fluid from a second fluid outside the cavity and having a second water concentration that is less than the first water concentration, the difference between the first water concentration and the second water concentration resulting in the transport of water through the $CO_2$ pump membrane from the first fluid to the second fluid and the formation of the water concentration gradient, wherein the $CO_2$ pump membrane comprises a moisture-swing material;
  continuously capturing $CO_2$ from the second fluid by maintaining the water concentration gradient within the $CO_2$ pump membrane, the water concentration gradient within the moisture-swing material of the $CO_2$ pump membrane creating a carbon concentration gradient across the $CO_2$ pump membrane that decreases from a second carbon concentration to a first carbon concentration moving from outside the cavity to inside the cavity, such that as water is continuously transported from the first fluid to the second fluid through the $CO_2$ pump membrane because of the water concentration gradient, carbon dioxide is continuously captured from the second fluid by the moisture-swing material of the $CO_2$ pump membrane and continuously pumped along the carbon concentration gradient across the $CO_2$ pump membrane and into the first fluid within the cavity.

15. The method of claim 14, wherein maintaining the water concentration gradient comprises increasing the first water concentration by adding a replacement fluid comprising water to the cavity and removing first fluid comprising captured $CO_2$ from the cavity.

16. The method of claim 14, wherein the first fluid is a gas comprising water vapor.

17. The method of claim 16, further comprising condensing a water content out of the first fluid removed from the cavity using a condenser.

18. The method of claim 17, further comprising reintroducing the water content condensed out of the first fluid removed from the cavity as at least part of the replacement fluid.

19. The method of claim 14, wherein the moisture-swing material of the $CO_2$ pump membrane is a quaternary ammonium-functionalized poly(arylene ether sulfone) copolymer.

20. The method of claim 19, wherein the moisture-swing material has a copolymerization unit based on diallyl bisphenal A (DABA).

* * * * *